(12) United States Patent
Cerea

(10) Patent No.: US 7,344,648 B2
(45) Date of Patent: Mar. 18, 2008

(54) USE OF SILICONES FOR CAUSING OR FACILITATING THE FLOW OF DISPERSIONS OF SOLID PARTICULATES IN LIQUIDS

(75) Inventor: Giuseppina Cerea, Rozzano (IT)

(73) Assignee: Vomm Chemipharma S.r.l., Rozzano (Milan) (IT)

( * ) Notice: Subject to any disclaimer, the term of this patent is extended or adjusted under 35 U.S.C. 154(b) by 265 days.

(21) Appl. No.: 11/126,764

(22) Filed: May 11, 2005

(65) Prior Publication Data

US 2005/0252865 A1    Nov. 17, 2005

(30) Foreign Application Priority Data

May 12, 2004  (EP) .................................. 04425338

(51) Int. Cl.
*C02F 11/14* (2006.01)
(52) U.S. Cl. ................... 210/710; 210/609; 210/727; 210/728; 210/732; 137/13
(58) Field of Classification Search ................ 210/732
See application file for complete search history.

(56) References Cited

U.S. PATENT DOCUMENTS

| | | | |
|---|---|---|---|
| 3,834,924 A | | 9/1974 | Grillo |
| 3,946,061 A | * | 3/1976 | Buckman et al. ........... 556/410 |
| 4,290,896 A | * | 9/1981 | Gordon et al. .............. 210/710 |
| 4,436,846 A | * | 3/1984 | Krantz ........................ 523/175 |
| 4,525,279 A | * | 6/1985 | Cooper ........................ 210/728 |
| 4,525,281 A | * | 6/1985 | Cooper ........................ 210/735 |
| 4,897,201 A | * | 1/1990 | Yamamoto et al. ......... 210/729 |
| 5,670,056 A | * | 9/1997 | Yoon et al. .................. 210/728 |
| 6,365,116 B1 | * | 4/2002 | Barham et al. ............. 423/121 |

FOREIGN PATENT DOCUMENTS

EP    1 400 554 A1    3/2004

* cited by examiner

*Primary Examiner*—Peter A. Hruskoci
(74) *Attorney, Agent, or Firm*—Akerman Senterfitt

(57) ABSTRACT

A method for causing or facilitating the flow of dispersions of solid particulates in liquids, having characteristics of high viscosity or resistance to flow, with particular reference to sludges from purification plants of civil or industrial wastes, which method comprises the addition to the dispersions of silicones of formula

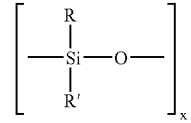

wherein R and R' are identical or different and represent a radical chosen between $C_1$-$C_5$ alkyl and aryl; x is an integer comprised between 3 and 2000.

7 Claims, No Drawings

USE OF SILICONES FOR CAUSING OR FACILITATING THE FLOW OF DISPERSIONS OF SOLID PARTICULATES IN LIQUIDS

FIELD OF APPLICATION

The present invention relates to a method for causing or facilitating the flow and the transfer of dispersions of solid particulates in liquids, with particular reference to concentrated sludges originating from purification plants or residues of chemical industry processes.

PRIOR ART

Water purification processes result in the production of sludges, which derive from the separation of suspended materials, from the precipitation of dissolved substances and most importantly from the transformation of organic substances into microbial cellular mass. Sludges may also originate come from civil and industrial wastes containing a large amount of suspended solids.

In order to be sent on to the dump for disposal, the sludges must first undergo a series of operations intended to reduce the volume and to decrease the hazardousness thereof.

First of all, the sludges are thickened either by means of particular settlers or by flocculation; subsequently they are deactivated either by means of aerobic or anaerobic digestion or by using a stabilisation method known as "lagooning".

After all the above mentioned operations, the sludges are dehydrated by means of centrifugation or filtration (under vacuum or by filter-press or belting-press), down to a content of water of about 60-80%.

At this point, the sludges must be sent on to a subsequent step of stockage and drying or to incineration or to the dump, or towards other disposal modes.

The transfer of these sludges is made difficult, however, by the high viscosity thereof to the point that the use of pumps is either complicated or simply not an option. Not even the highest efficiency pumps available on the market succeed in transferring such sludges.

It is thus necessary to employ alternative transfer methods, such as transport on belts, which are, however, disadvantageous both from the economic point of view, due to their low efficiency, and from the environmental and toxicological point of view, as sludges remain exposed to air during the transfer, with consequent risks for the operators.

Similar sludges or however very thick and viscous dispersions of solid particulates in liquids are often found also in other industrial fields. Simply by way of example, the residues of petrol oil refineries can be cited. In such cases, again, one is confronted with a mass that is difficult, if not impossible, to transfer by means of pumps and one is forced to turn to the alternative and unsatisfactory transfer means mentioned above.

The problem underlying the present invention has thus been that of enabling the transfer of dispersions of solid particulates in liquids, in particular sludges, which, because of their characteristics of high viscosity and sometimes because of their rheopectic behaviour, have resulted, so far, to be non transferable by means of pumps.

Such a problem has been solved, according to the invention, by a method for causing or facilitating the flow and the transfer of dispersions of solid particulates in liquids having characteristics of high viscosity or resistance to flow, comprising the step of adding to said dispersions at least one silicone of formula

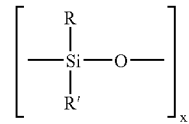

wherein R and R' are identical or different and represent a radical chosen between $C_1$-$C_5$ alkyl and aryl; x is an integer comprised between 3 and 2000.

Once said silicones have been added to the dispersions, it becomes possible to transfer the latter by means of pumps.

In the preferred silicones for the purposes of the present invention, R and R' are identical and they are chosen between methyl and phenyl and x is comprised between 3 and 100.

The polysiloxanes wherein R and R' are both methyl are particularly preferred.

The silicones are added to the dispersions at issue and they are uniformely distributed therein by means of conventional stirrers or mixers.

In the particular case of the sludges, the addition of the silicones can conveniently be carried out prior to mechanical dehydration, i.e. prior to centrifugation or filtration, or after such treatment, before, during or after their transfer by means of pumps to the steps of stockage or disposal.

The silicones are added to the dispersions in amounts preferably equal to 0.005-5%, conveniently equal to 0.01-1%, of the dry weight of the dispersion to be transferred.

An example of silicone particularly suitable for use according to the present invention is the polydimethylsiloxane produced by the firm GE Silicones and marketed under the name "OIL M 350—tote".

The silicones can be used as such or, especially when the dispersion to be transferred is an aqueous dispersion, in the form of aqueous emulsions currently marketed as antifoam agents. An example of such silicone aqueous emulsions is constituted by the antifoam product 510 S of the firm GE Bayer Silicones.

The present invention will be further described with reference to an embodiment, given hereafter by way of illustrative and non limiting example.

EXAMPLE

A sludge of a purification plant of civil wastes, previously thickened by flocculation and then deactivated by aerobic digestion, having a dry substance content of 2%, has been mechanically dehydrated (centrifugation or filtration) up to 20% dry substance.

A polydimethylsiloxane aqueous emulsion of has been added to the dehydrated sludge straight in the pump being used for its transfer to the stockage sites, and precisely the "antifoam 510 S" product of GE Bayer Silicones previously diluted 1:5 with water, in such a volume as to contain an amount of silicone (on a dry weight basis) of 0,8% of the dry weight of the sludge.

The addition of the silicone has determined a considerable increase of the flow of the sludge, which has caused a 50% reduction of the electric absorption of the monho type transfer pump.

In the absence of silicones, the transfer of the same dehydrated sludge by means of pumps had been either impossible or extremely difficult and even the addition of conventional flowing agents, such as polyelectrolytic solutions, had given scarcely satisfactory results.

As mentioned above, the present invention has been illustrated by making reference to sludges from civil or industrial wastes, but it finds application in all those cases in which difficulties are found in the transfer of dispersions of solid particulates (both aqueous dispersions and dispersions in organic or mixed solvents), characterised by a high viscosity or resistance to flow, or even by a rheopectic behaviour.

What is claimed is:

1. A method for causing or facilitating the flow and the transfer of dispersions of solid particulates in liquids having characteristics of high viscosity or resistance to flow, said dispersions being sludges from purification plants, the method comprising the steps of:

dehydrating the sludges;

adding to said sludges after the dehydration step at least one polysiloxane of the formula

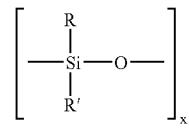

wherein R and R' are identical or different and represent a radical chosen between C1-C5 alkyl and aryl, and x is an integer comprised between 3 and 2000; and transferring the sludges to subsequent steps of stockage and disposal by means of pumps.

2. A method according to claim 1, wherein said at least one polysiloxane comprises polydimethylsiloxane.

3. A method according to claim 1, wherein said sludges are from purification plants of civil or industrial wastes.

4. A method according to claim 3, wherein the dehydration step is carried out by centrifugation or filtration by filter-press or belting-press.

5. A method according to claim 1, wherein said polysiloxane is added to said dispersions in the amount of 0.005-5% of the dry weight of the dispersion.

6. A method according to claim 5, wherein said polysiloxane is added to said dispersions in the amount of 0.01-1% of the dry weight of the dispersion.

7. A method according to claim 1, wherein said dispersions are aqueous dispersions and said polysiloxane is added in the form of an aqueous emulsion.

* * * * *